Figure 1:
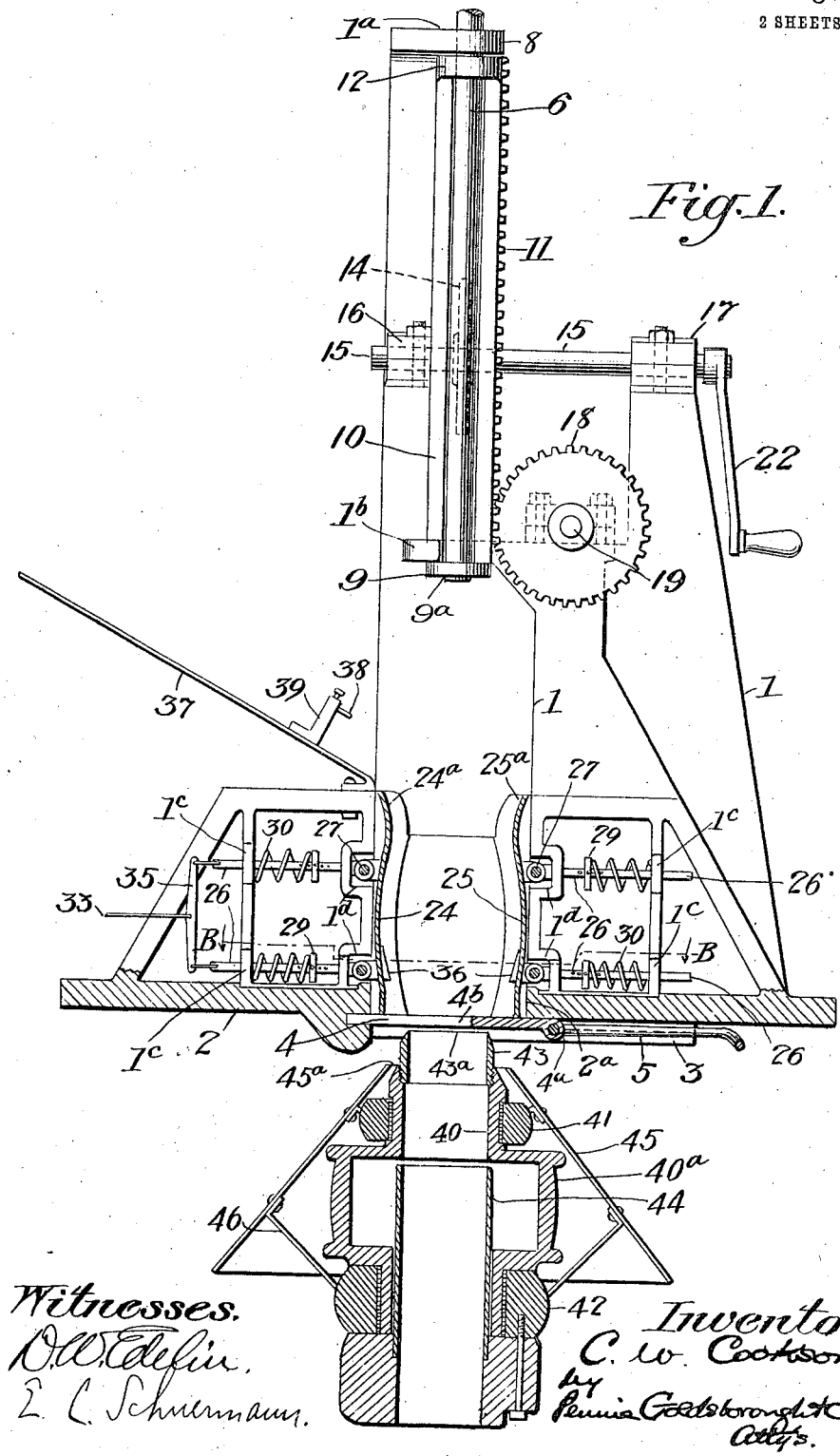

C. W. COOKSON.
MACHINE FOR CORING AND SIZING PINEAPPLES.
APPLICATION FILED APR. 19, 1910.

1,001,931.

Patented Aug. 29, 1911.

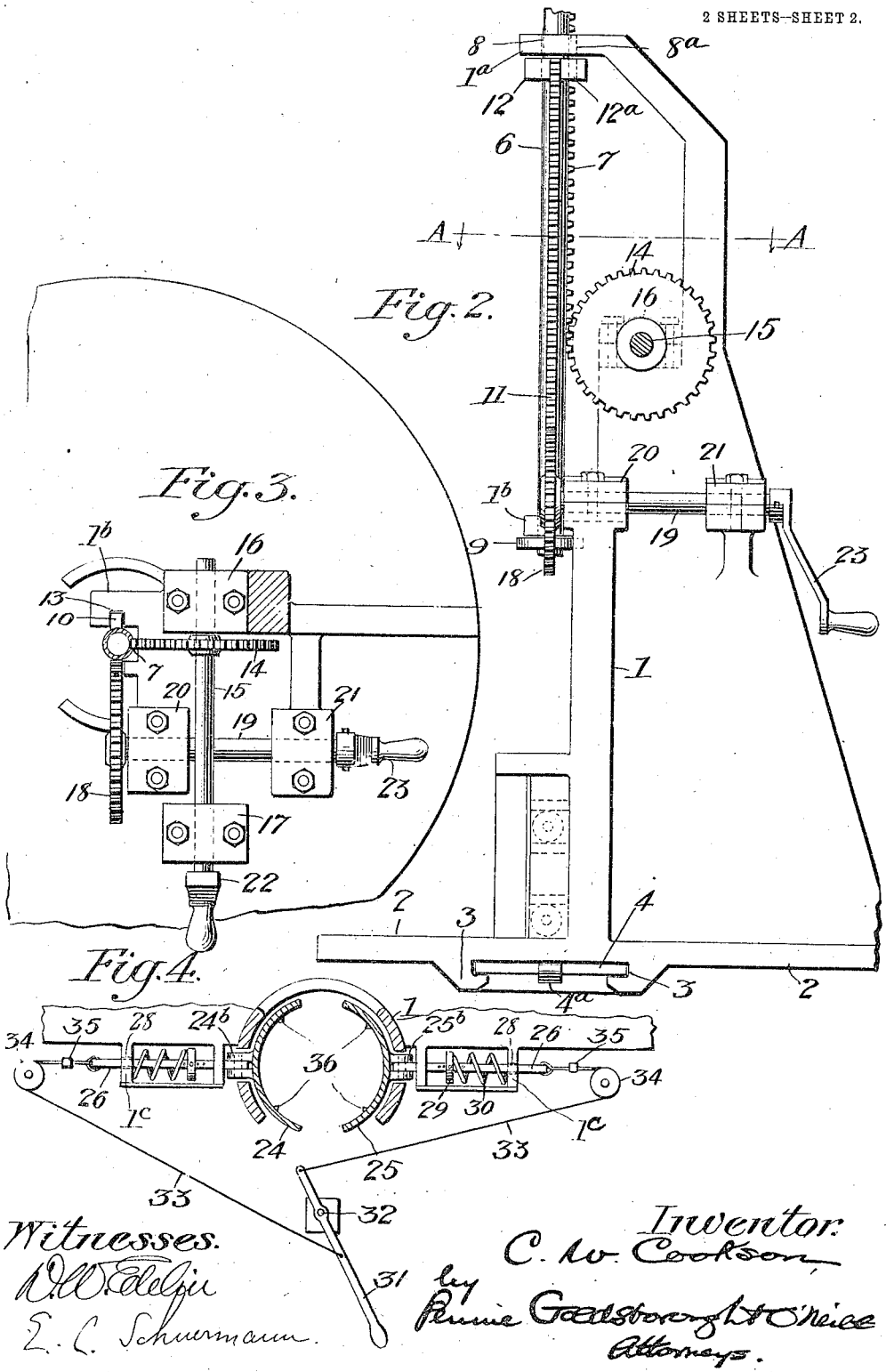

UNITED STATES PATENT OFFICE.

CHARLES WILLIAM COOKSON, OF WAHIAWA, TERRITORY OF HAWAII.

MACHINE FOR CORING AND SIZING PINEAPPLES.

1,001,931.   Specification of Letters Patent.   Patented Aug. 29, 1911.

Application filed April 19, 1910. Serial No. 556,412.

*To all whom it may concern:*

Be it known that I, CHARLES WILLIAM COOKSON, a citizen of the United States, residing at Wahiawa, in the county of Honolulu and Territory of Hawaii, have invented certain new and useful Improvements in Machines for Coring and Sizing Pineapples; and I do hereby declare the following to be a full, clear, and exact description of the invention, such as will enable others skilled in the art to which it appertains to make and use the same.

My invention relates to machines for treating fruit such as pineapples to prepare them for canning.

The object of my invention is to produce a machine which will core, and size the unpeeled fruit in a rapid and efficient manner. I am aware that there are machines now on the market which core and size the fruit after it has been previously peeled. My invention, however, contemplates a machine for performing the functions of coring and sizing the unpeeled fruit without handling the fruit twice. I accomplish this object by the mechanism hereinafter described and claimed, reference being had to the accompanying drawings, in which—

Figure 1 represents an elevation of the machine the lower portion being shown in section for the sake of clearness. Fig. 2 is a side elevation of the upper portion of the machine. Fig. 3 is a sectional plan view of the upper portion of the machine on the line A—A of Fig. 2. Fig. 4 is a sectional view of a portion of the machine on the line B—B of Fig. 1.

The vertical frame 1 of the machine is provided with a horizontal base plate 2, which may be supported in any suitable manner. The base plate 2 is provided with an opening $2^a$, and with two guides 3 on the under side of said base plate. The plate abutment 4 is adapted to slide in the grooves 3, such that it may close temporarily the opening $2^a$, Fig. 1. The abutment 4 may be operated by a handle 5 attached to the lug $4^a$, and it is provided with a slot $4^b$ to its center for the purpose hereinafter mentioned.

The coring tube 6 is provided with an external rack 7, and is guided in a hole 8 in the upper end $1^a$ of the frame 1, said hole 8 being cut out at $8^a$ to clear the rack 7. The coring tube 6 is also guided by passing through a similarly shaped hole $9^a$ in the pusher plate 9. The lower ends of the guide bar 10 and the rack 11 are secured to the pusher plate 9 on opposite sides of the coring tube 6. The guide ring 12, cut out at $12^a$ to clear the rack 7, is adapted to slide on the coring tube 6. The upper ends of the guide bar 10 and the rack 11 are secured to the guide ring 12 on opposite sides of the coring tube 6. The guide bar 10 is adapted to slide in the groove 13 in the lug $1^b$ of the frame 1, and is guided thereby. The center of the coring tube 6 is vertically above the center of the opening $2^a$ in the base plate 2. A gear 14 meshes with the rack 7 and is secured to a shaft 15 journaled in boxes 16 17 supported by the frame 1. A gear 18 meshes with the rack 11 and is secured to a shaft 19 journaled in the boxes 20 21 supported by the frame 1. The shafts 15 and 19 are provided with operating cranks 22 and 23 respectively.

Two similar but oppositely disposed centering shoes 24 25 are provided, each having a cross section which is nearly semicircular as shown in Fig. 4, and a vertical section preferably such that their inner surfaces may approximately fit the average shape of the fruit to be treated, and with the upper ends $24^a$ $25^a$ preferably flared outwardly as shown in Fig. 1, to aid in admitting the fruit between the shoes 24 25. Eye-bars 26 are loosely hinged by pins 27 through ears $24^b$ $25^b$ on the outside of the shoes 24 25 respectively. The eye-bars 26 are guided in holes 28 in the lugs $1^c$ of the frame 1. Pockets $1^d$ are provided in the frame 1 to clear the ears $24^b$ $25^b$ when the shoes 24 25 are in their outward position as shown in Fig. 1. The eye-bars 26 are provided with adjustable collars 29, and a spiral spring 30 is interposed between each collar 29 and lug $1^c$ of the frame 1, whereby the shoes 24 25 are normally forced toward one another.

Means are provided for drawing the shoes 24 25 apart or away from one another, against the action of the springs 30, the object being to separate said shoes and thereby enlarge the opening so as to admit the fruit to be treated between them. This may be accomplished in any suitable manner, for example, as indicated in Fig. 4. A lever 31 is pivoted on the pin 32. One end of each of two ropes 33 is attached to the lever 31, and the other end of each rope 33 is attached to an evener 35 at its center. The end of each evener 35 is flexibly attached to an end of an eye-bar 26. The ropes 33 pass over the sheaves 34. One or more knives 36 may be secured to the inner surface of each shoe 24 25, and preferably near their lower ends. A chute 37 is provided for feeding the fruit successively to the machine. If desired, two or more oppositely disposed knives 38 may be adjustably supported by the castings 39 on the sides of the chute 37, to cut the rind of the fruit longitudinally when it is forced down said chute between said knives.

A revoluble head 40, journaled in bearings 41 42 located below the base plate 2, is provided at its upper end with a renewable circular sizing knife 43, the cutting edge 43ª of which is below and clears the abutment 4. The center line of the sizing knife 43 is coincident with the center line of the coring tube 6, and the sizing knife is concentric with the opening 2ª in the base plate 2 but below the same. A stationary tube 44 of slightly larger diameter than that of the sizing knife 43 is secured below the latter within the head 40 and attached to the under side of the bearing 42. The head 40 with sizing knife 43 is revolved in any suitable manner, as by a belt (not shown) running on the outside pulley portion 40ª of said head. A hood 45, with an opening 45ª at its upper end to admit the sizing knife 43, is supported by braces 46 attached to the bearings 41, 42.

In operation, the abutment 4 is slid in the guides 3 to cover the opening 2ª; and the shoes 24 25 are separated by moving the lever 31 to the position shown in Fig. 4. A fruit, preferably from which the ends have been sliced, is now moved down the chute 37 and drops into the opening between the shoes 24 25, being guided by the flared ends 24ª 25ª, and the fruit now rests upon the abutment 4. The lever 31 is then released, the springs 30 force the shoes 24 25 toward one another and cause them to engage the fruit and center same upon the abutment 4. The coring tube 6 is now lowered, by operating the crank 22, and is forced through the fruit until its cutting end passing through the slot 4ᵇ in the abutment 4 enters within the sizing knife. The abutment 4 is now withdrawn, uncovering the opening 2ª, the slot 4ᵇ clearing the coring tube 6 and permitting of such withdrawal. The pusher plate 9 is lowered, by operating the crank 23, and in lowering engages the top of the fruit and pushes same ahead of it. The knives 36 slit or incise the rind longitudinally when the fruit is thus lowered. The lower end of the fruit soon encounters the revolving sizing knife 43, which cuts off the rind thus slit and such portions of the fruit as are larger than will pass through said sizing knife and through the stationary tube 44. The rind having been slit open, either by the knives 36 or by the knives 38, falls apart and down the incline of the hood 45. The pusher 9 forces the sized fruit through the sizing knife 43 and it drops through the tube 44. The coring tube 6, with the core of the fruit within same, and the pusher 9 are now returned to their upper positions. The operation as described is repeated with the next fruit. It will now be noted that the machine cores, and sizes the unpeeled fruit and prepares same for canning or other uses.

While the machine described is particularly applicable to treating pineapples, it is obvious that it may be employed for treating articles other than pineapples.

Of course changes may be made in the arrangement and construction of parts without departing from the scope of my invention.

I claim:

1. In a fruit sizing machine, a rotary sizing head, oppositely disposed fruit-centering shoes located in advance of said head and yieldingly urged toward each other, and slitting devices on the interior surfaces of said shoes.

2. In a fruit sizing machine, a sizing head, oppositely disposed centering elements located in advance of said head, means to urge said elements toward each other to grip the fruit, and means for retracting said elements simultaneously.

3. In a fruit sizing machine, a sizing head, centering shoes in advance of the same and provided at their inner faces with slitting or incising means, means normally urging said shoes toward each other, and means for retracting said shoes.

4. In a fruit slicing machine, a sizing head, centering shoes in advance of the same and having slitting devices on their inner surfaces, springs acting on each shoe at different points and urging it toward the other shoe to grip the fruit between said shoes, and means to retract said shoes to enable the fruit to enter therebetween.

5. In a fruit sizing machine, a sizing head, yieldingly mounted centering shoes in advance of the same and having slitting devices on their opposing inner surfaces, means to withdraw said shoes laterally from each other, and means to push the fruit between said shoes and into the sizing head.

6. In a fruit coring and sizing machine, a sizing head, centering shoes in advance of the same and yieldingly urged toward each other to grip the fruit, an abutment movable between said head and said shoes to retain the fruit between the latter, and a coring tube movable between said shoes.

7. In a fruit coring and sizing machine, a sizing head, centering shoes in advance of the same, an abutment movable transversely between said shoes and said head, and a coring tube movable longitudinally between the shoes.

8. In a fruit coring and sizing machine, a sizing head, centering shoes in advance of the same, an abutment movable transversely between said shoes and said head, a coring tube movable longitudinally between the shoes, and a device to push the cored fruit from the shoes into the sizing tube when said abutment is removed from operative position.

9. In a fruit coring and sizing machine, a sizing head, an abutment movable over the same, opposing shoes in advance of said head to clamp a fruit on said abutment, means to core the fruit so positioned, and means to push the cored fruit through the sizing head when said abutment is removed therefrom.

10. In a fruit coring and sizing machine, a sizing head, means to position a fruit in advance of said head and including opposing spring-pressed shoes, means to core the fruit so positioned, and means to then push the fruit into the sizing head.

11. In a fruit coring and sizing machine, a sizing head, fruit positioning means in advance thereof embodying slitting devices, means to core the fruit when positioned by said means, and means to push the fruit past said slitting devices and into the sizing head.

12. In a fruit coring and sizing machine, a sizing head, fruit positioning means in advance of the same and comprising an abutment movable over said head, and centering shoes having rind incising devices, means to core the fruit when positioned between said shoes and against said abutment, and means to push the fruit from between said shoes into said sizing head when said abutment is removed, whereby the rind of the fruit is incised prior to the sizing operation.

13. In a fruit coring and sizing machine, a sizing head, an abutment movable over the same, centering and incising devices in advance of said abutment, a coring tube movable between said devices and toward and away from said abutment, and a pushing device movable toward and away from said sizing head.

14. In a fruit coring and sizing machine, a sizing head, an abutment movable over the same, centering and incising devices in advance of said abutment, a coring tube movable between said devices and toward and away from said abutment, and a pushing device movable coaxially with said coring tube.

In testimony whereof I affix my signature, in presence of two witnesses.

CHARLES WILLIAM COOKSON.

Witnesses:
 ROBT. J. PRATT,
 JOSEPH G. PRATT.